US008296920B2

(12) United States Patent
Lin

(10) Patent No.: US 8,296,920 B2
(45) Date of Patent: Oct. 30, 2012

(54) METHOD FOR MAKING A HAND TOOL

(76) Inventor: Yu-Hwa Lin, Taichung (TW)

( * ) Notice: Subject to any disclaimer, the term of this patent is extended or adjusted under 35 U.S.C. 154(b) by 901 days.

(21) Appl. No.: 12/257,406

(22) Filed: Oct. 24, 2008

(65) Prior Publication Data

US 2010/0037411 A1 Feb. 18, 2010

(30) Foreign Application Priority Data

Aug. 15, 2008 (TW) ............................... 97131069 A

(51) Int. Cl.
*B21D 53/00* (2006.01)
*B21D 22/00* (2006.01)
*B23P 25/00* (2006.01)

(52) U.S. Cl. .............. 29/412; 29/417; 29/450; 72/379.2

(58) Field of Classification Search .................... 29/412, 29/458, 242, 278, 557, 403.1, 417; 81/177.1; 72/379.2
See application file for complete search history.

(56) References Cited

U.S. PATENT DOCUMENTS 1,369,762 A * 2/1921 Curtiss ......................... 15/235.4
1,480,823 A * 1/1924 Larson ............................ 294/57
2,050,868 A * 8/1936 Tibbott ......................... 12/115.8
3,981,043 A * 9/1976 Curry .............................. 16/430
4,972,697 A * 11/1990 Andrea ......................... 72/379.2
6,119,321 A * 9/2000 Bruce ............................... 29/14

OTHER PUBLICATIONS

Edward G. Hoffman, "Production methods", in AccessScience@McGraw-Hill, http://www.accessscience.com, DOI 10.1036/1097-8542.547200, last modified: Aug. 15, 2002.*

* cited by examiner

*Primary Examiner* — Jermie Cozart

(57) ABSTRACT

A hand tool includes a plate-like body having a connection end from which a handle is integrally connected there which includes a first section and a second section. A grip is connected to the second section. The first section extends from the connection end by an upward angle and the second section integrally extends from the first section by an angle and toward opposite to the connection end. Each of the first and second sections includes a wall which is a curved wall and faces downward. The hand tool is punched from a metal board and includes a plate-like body and an extension portion which is then bent to form the handle and a grip is connected to the handle.

4 Claims, 12 Drawing Sheets

METHOD FOR MAKING A HAND TOOL

FIELD OF THE INVENTION

The present invention relates to a hand tool such as trowel or joint knife and a method for making the handle tool.

BACKGROUND OF THE INVENTION

A conventional hand tool for applying cement on a surface, such as trowel or joint knife or as disclosed in U.S. Pat. No. 7370384 and 5522111, generally includes a plate-like body, an extension rod and a handle which is connected with a grip and the extension rod. The plate-like body and the extension rod are usually two individual parts which are connected to each other by welding or multiple parts. However, the welding process needs a welding machine and skilled persons, and the more the number of the parts is needed, the higher maintenance cost is required. Most to the extension rods will be loosened and eventually separated form the plate-like body.

The present invention intends to provide a hand tool having a plate-like body and a handle which is integrally formed with the plate-like body. The hand tool can be made by way of mass production to reduce the fabrication cost thereto.

SUMMARY OF THE INVENTION

The present invention relates to a hand tool which comprises a plate-like body having a connection end and a handle is integrally connected to the connection end and includes a first section and a second section. The first section extends from the connection end by an upward angle and the second section integrally extends from the first section by an angle and toward opposite to the connection end. Each of the first and second sections includes a wall which is a curved wall and faces downward.

The present invention relates to a method for making a hand tool and the method comprises the following steps:

a step of pre-treatment for a metal board;

a step of punching multiple parts from the metal board and each part including a plate-like body and an extension portion integrally extending from the plate-like body;

a step of bending the extension portion to include a first section and a second section, the first section extending from the plate-like body by an upward angle and the second section extending from the first section by an angle and toward opposite to a connection end from which the first section extends;

a step of bending the first and second sections to have an inverted U-shaped wall so as to form a handle, and a step of applying a post treatment to the plate-like body 1*a* and the handle.

The primary object of the present invention is to provide a hand tool such as trowels, joint knives, pressure knives, tapping knives, drywall knives or putty knives, wherein the handle is integral to the plate-like body so that the handle does not separated from the plate-like body.

Another object of the present invention is to provide a method for making a hand tool such as trowels, joint knives, pressure knives, tapping knives, drywall knives or putty knives, the method is suitable for mass production at low cost.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
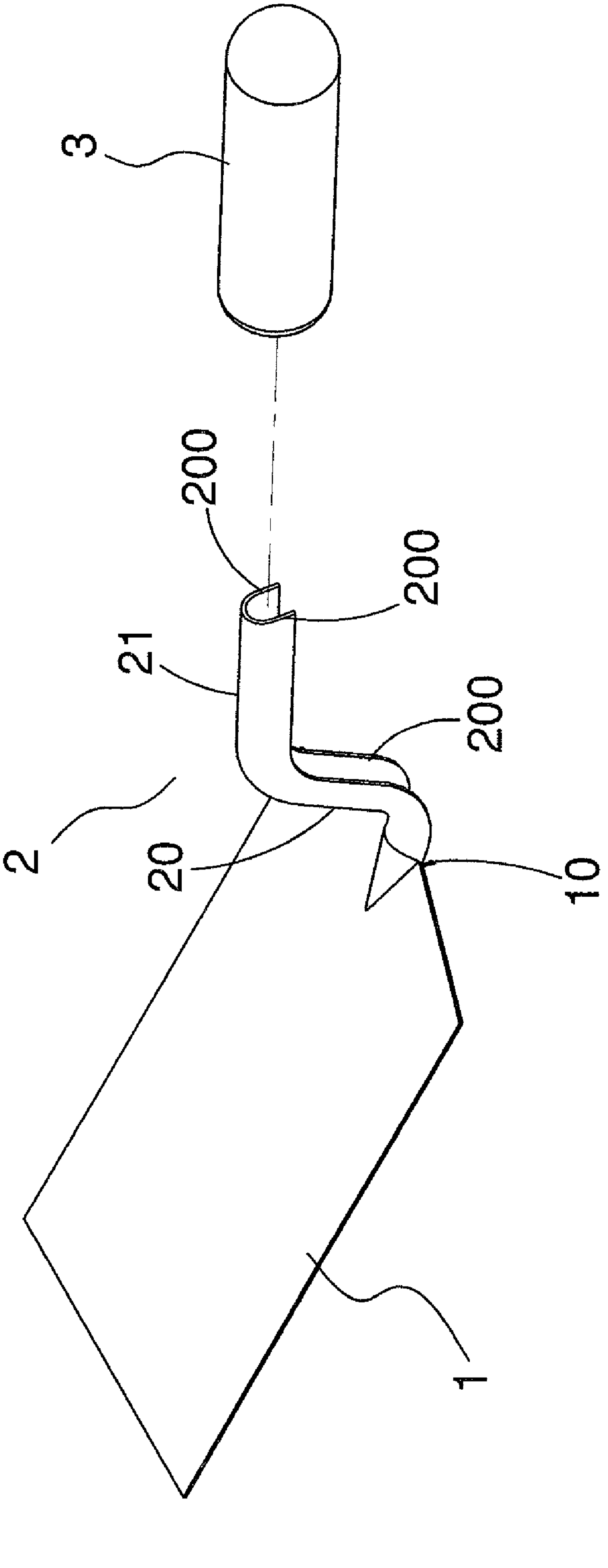
FIG. 1 is an exploded view to show the hand tool of the present invention.
Figure 2:
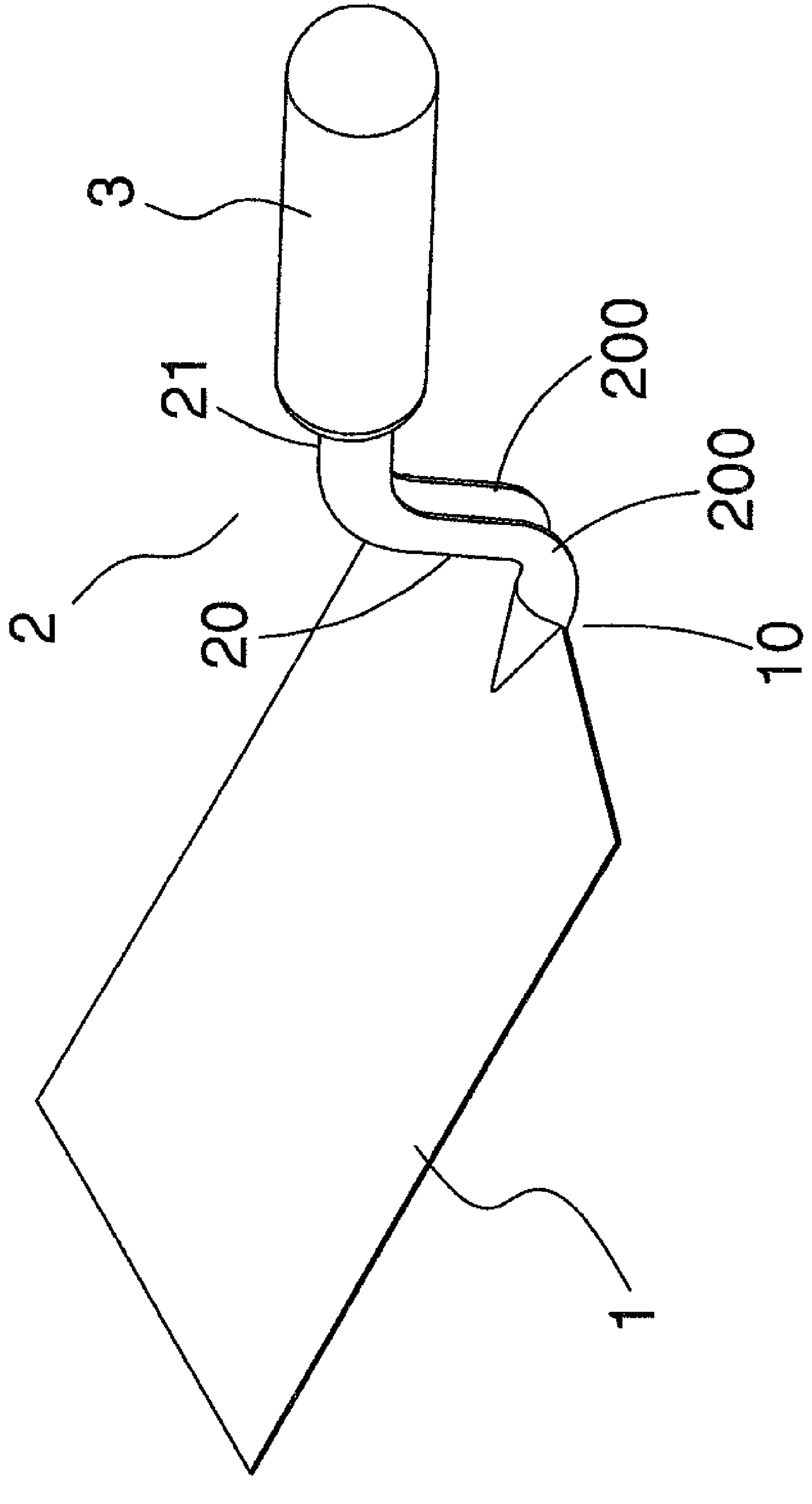
FIG. 2 is a perspective view to show the hand tool of the present invention.
Figure 3:
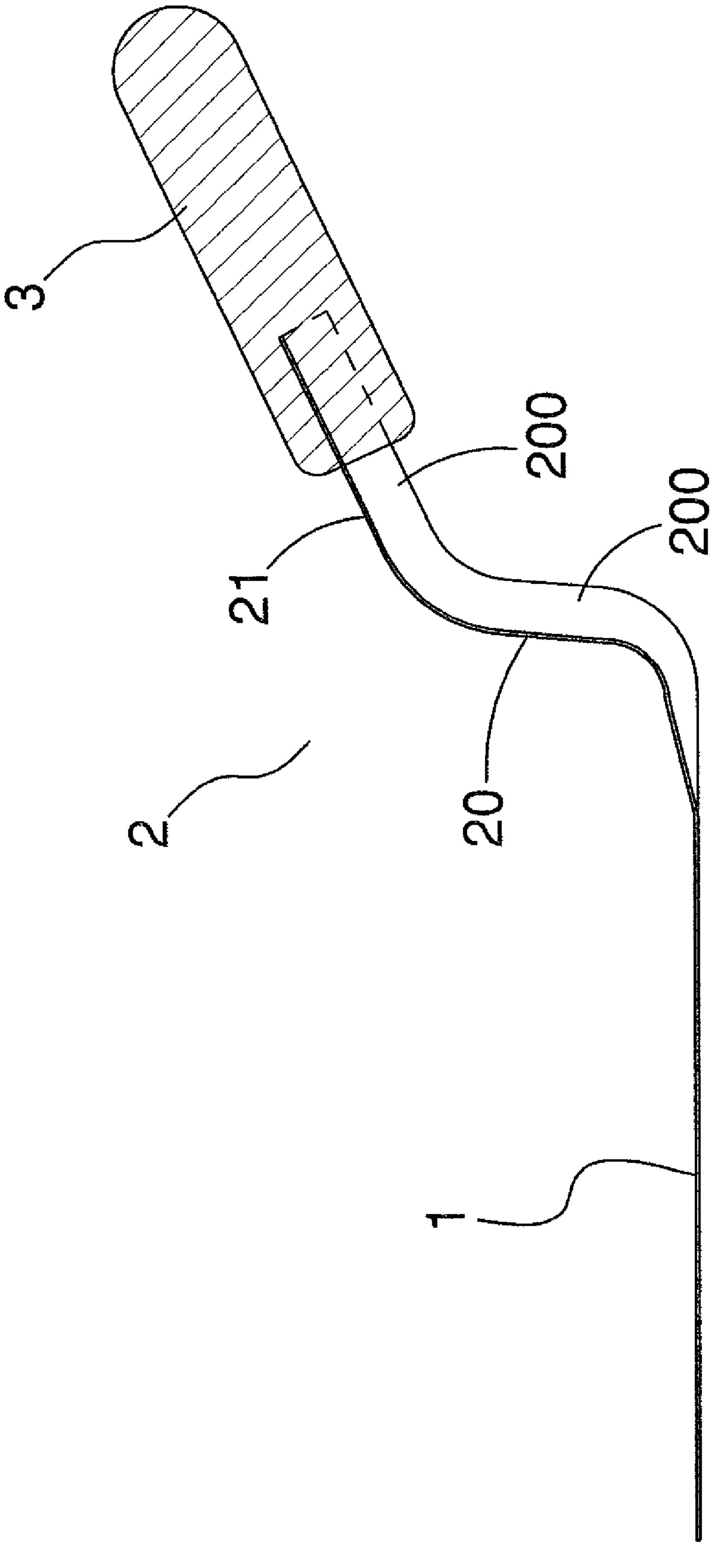
FIG. 3 is a partial cross sectional view of the hand tool of the present invention.

Referring to FIGS. 1 to 3, the hand tool of the present invention comprises a plate body 1 which has a connection end 10, and a handle 2 is integrally connected to the connection end 10. The handle 2 and the plate body 1 are made integrally by the same material. The handle 2 includes a first section 20 and a second section 21, wherein the first section 20 extends from the connection end 10 by an upward angle relative to the plate body 1 and the second section 21 integrally extends from the first section 20 by an angle and toward one end opposite to the connection end 10. Each of the first and second sections 20, 21 includes a wall 200 which is a curved wall and faces downward. The curved wall can be an inverted U- shaped wall, an inverted V-shaped wall. A grip 3 is connected to the second section 21 and the grip 3 can be made by wood or plastic.

Figure 4:
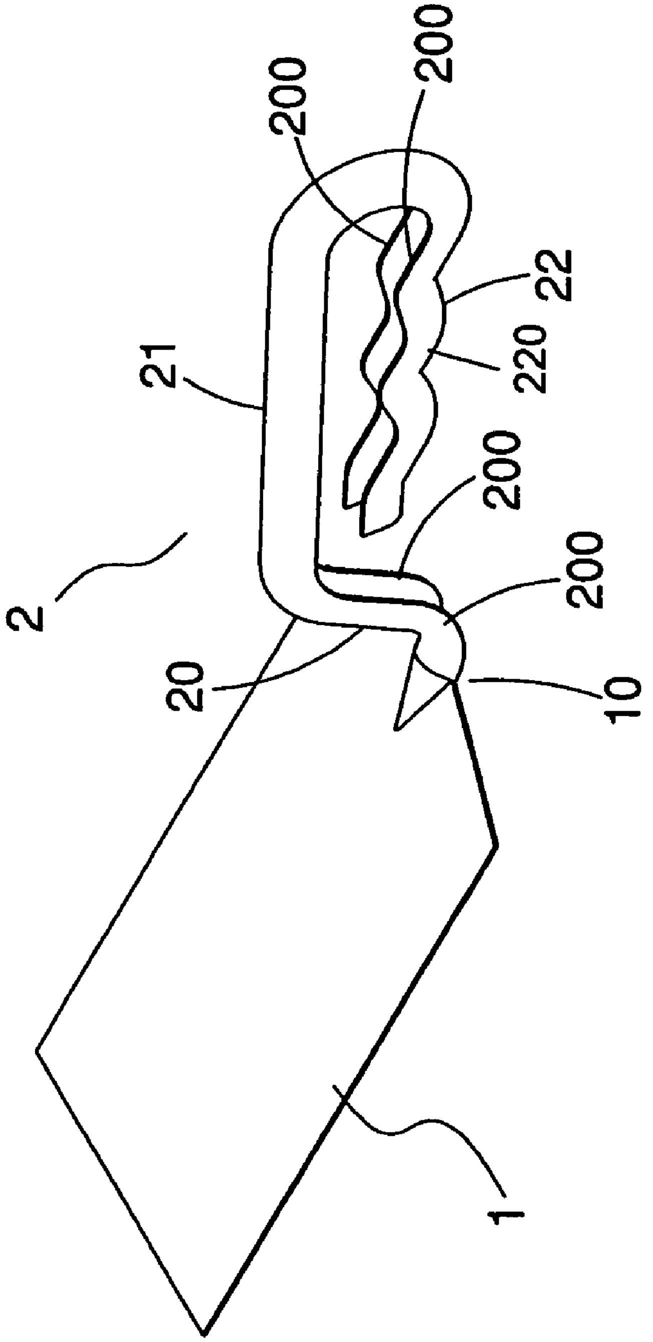
FIG. 4 is a perspective view to show a second embodiment of the hand tool of the present invention.
Figure 5:
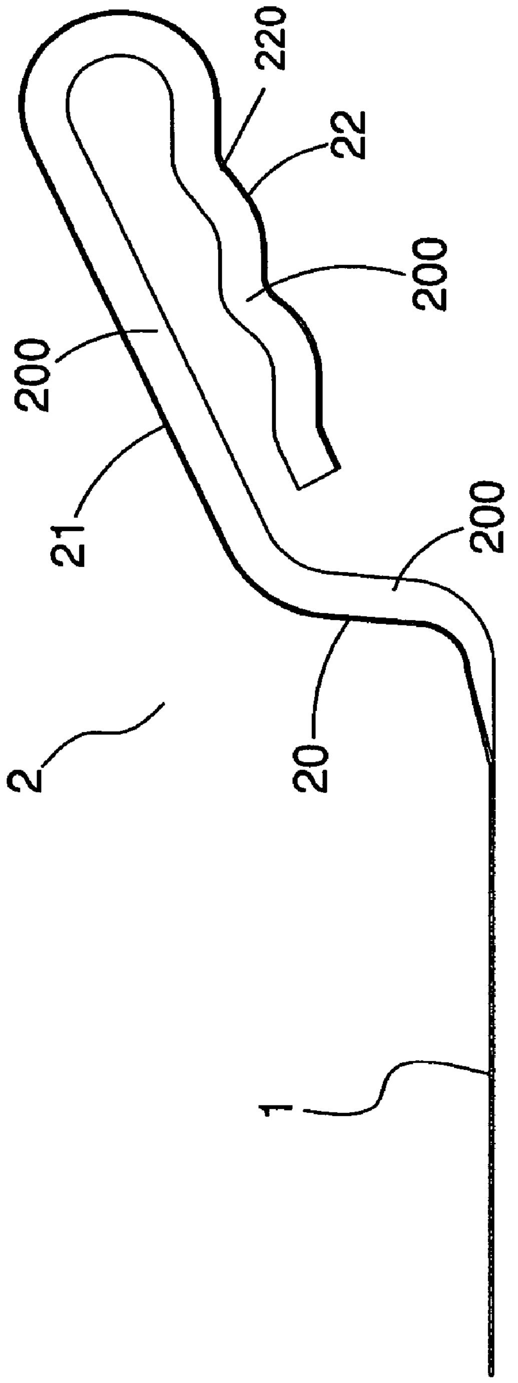
FIG. 5 is a side view to show the hand tool in FIG. 4.

FIGS. 4 and 5 show a second embodiment of the hand tool of the present invention wherein a third section 22 extends from a distal end of the second section 21 and bent toward the plate body 11. The third section 22 is located beneath the second section 21 and includes curved wall which faces upward. The third section 22 further includes wave-shaped underside 220 which is suitable for the user to grip firmly.

Figure 6:
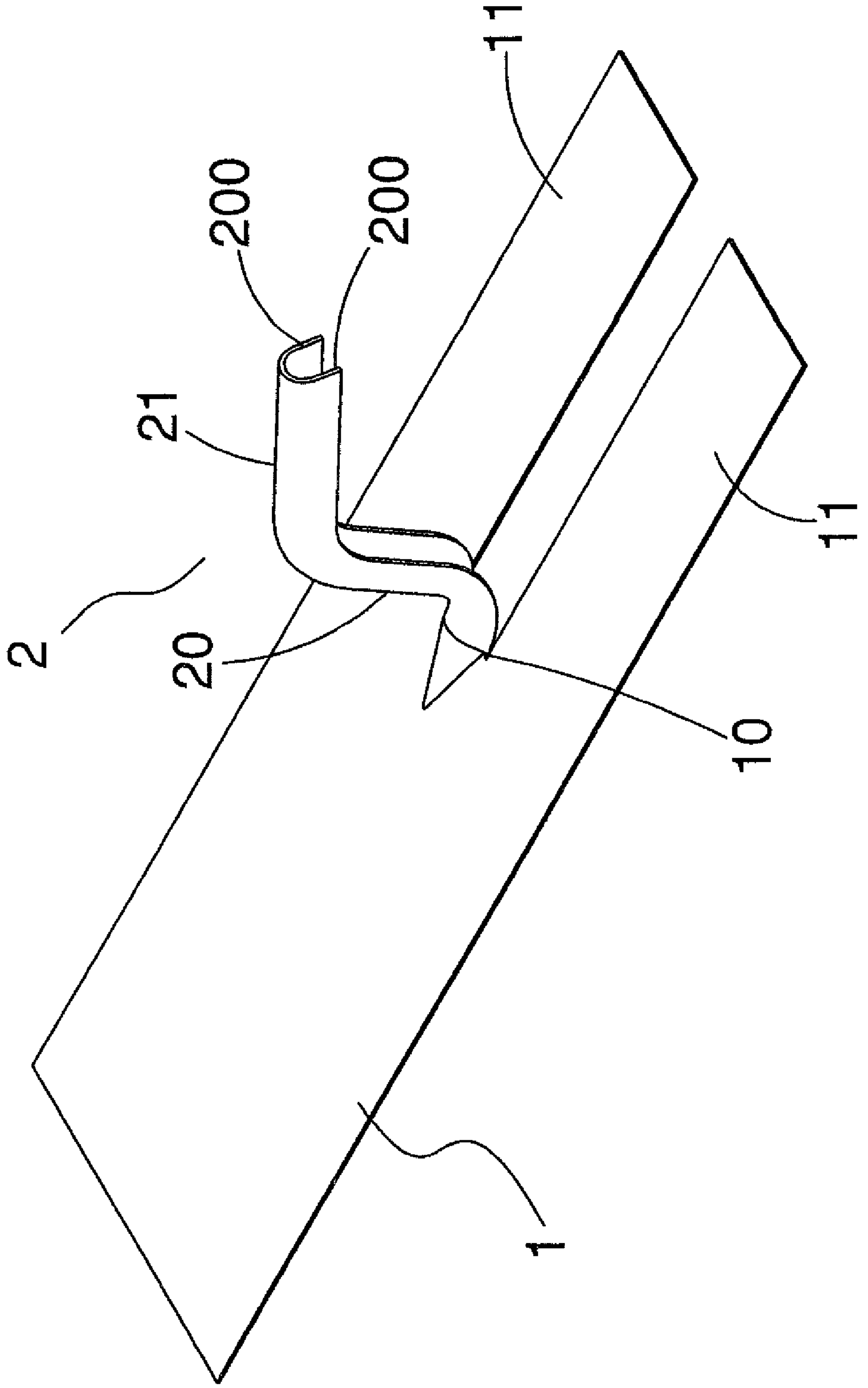
FIG. 6 is a perspective view to show a third embodiment of the hand tool of the present invention.

FIG. 6 shows the third embodiment of the hand tool of the present invention wherein two extensions 11 extend from the connection end 10 of the plate body 1 and the handle 2 is located between the two extensions 11.

Figure 7:
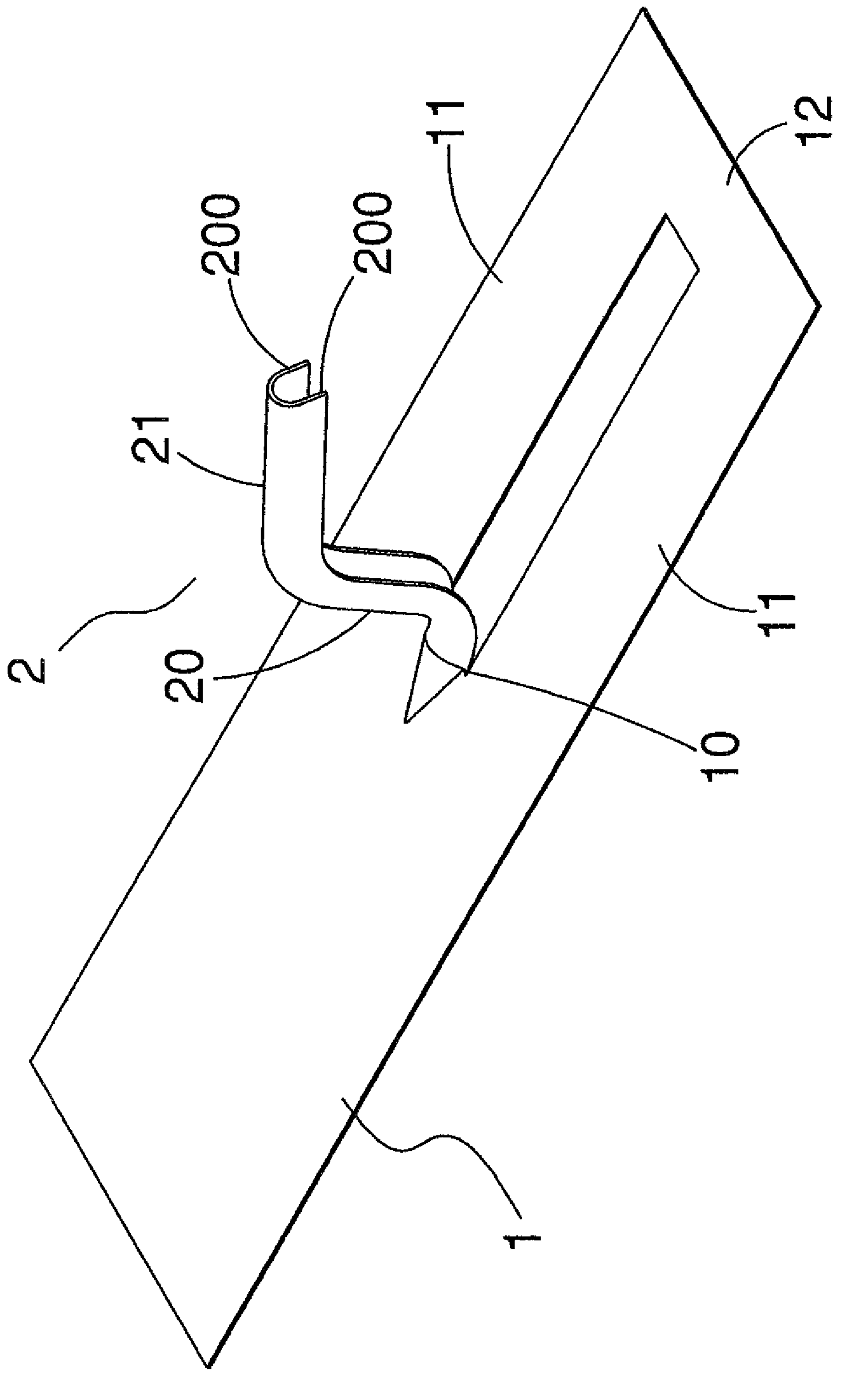
FIG. 7 is a perspective view to show a fourth embodiment of the hand tool of the present invention.
Figure 8:
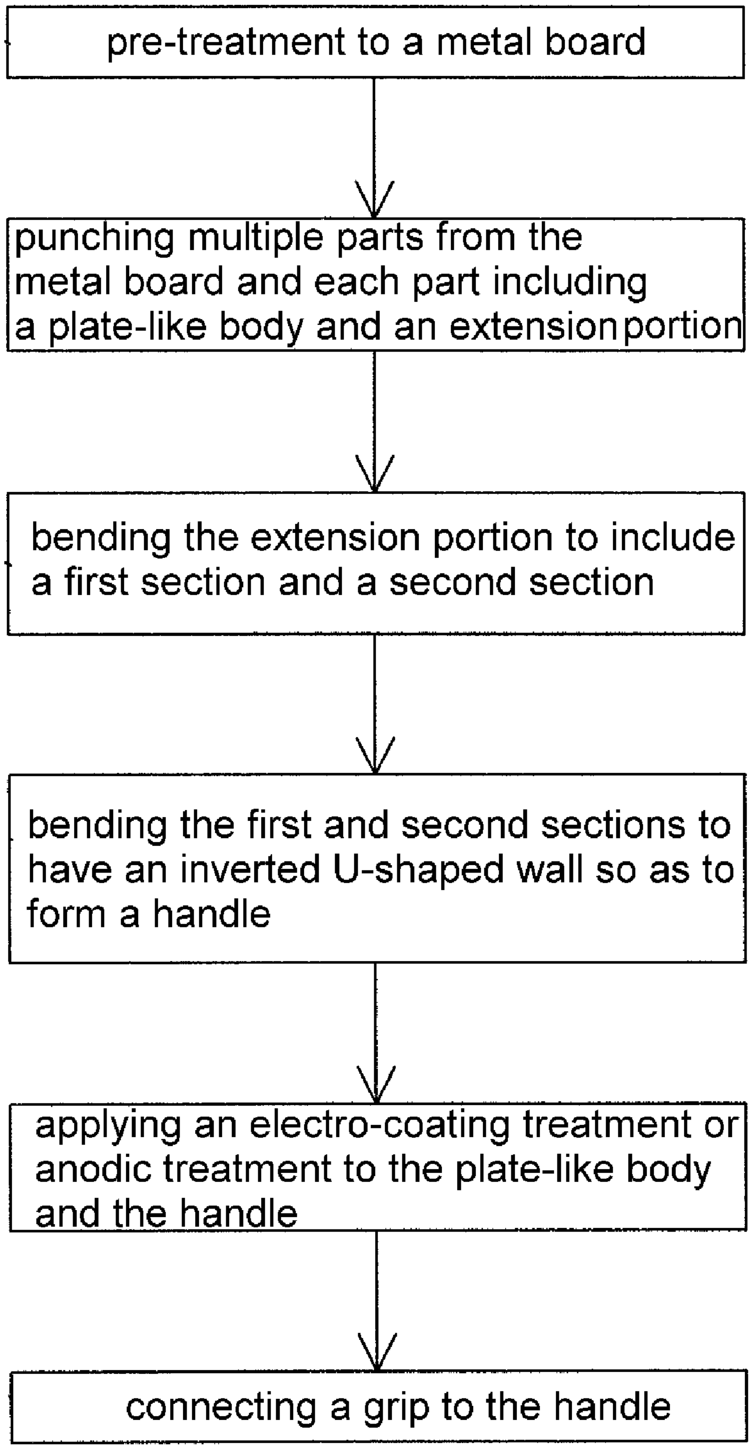
FIG. 8 shows the steps of the method for making the hand tool of the present invention.
Figure 9:
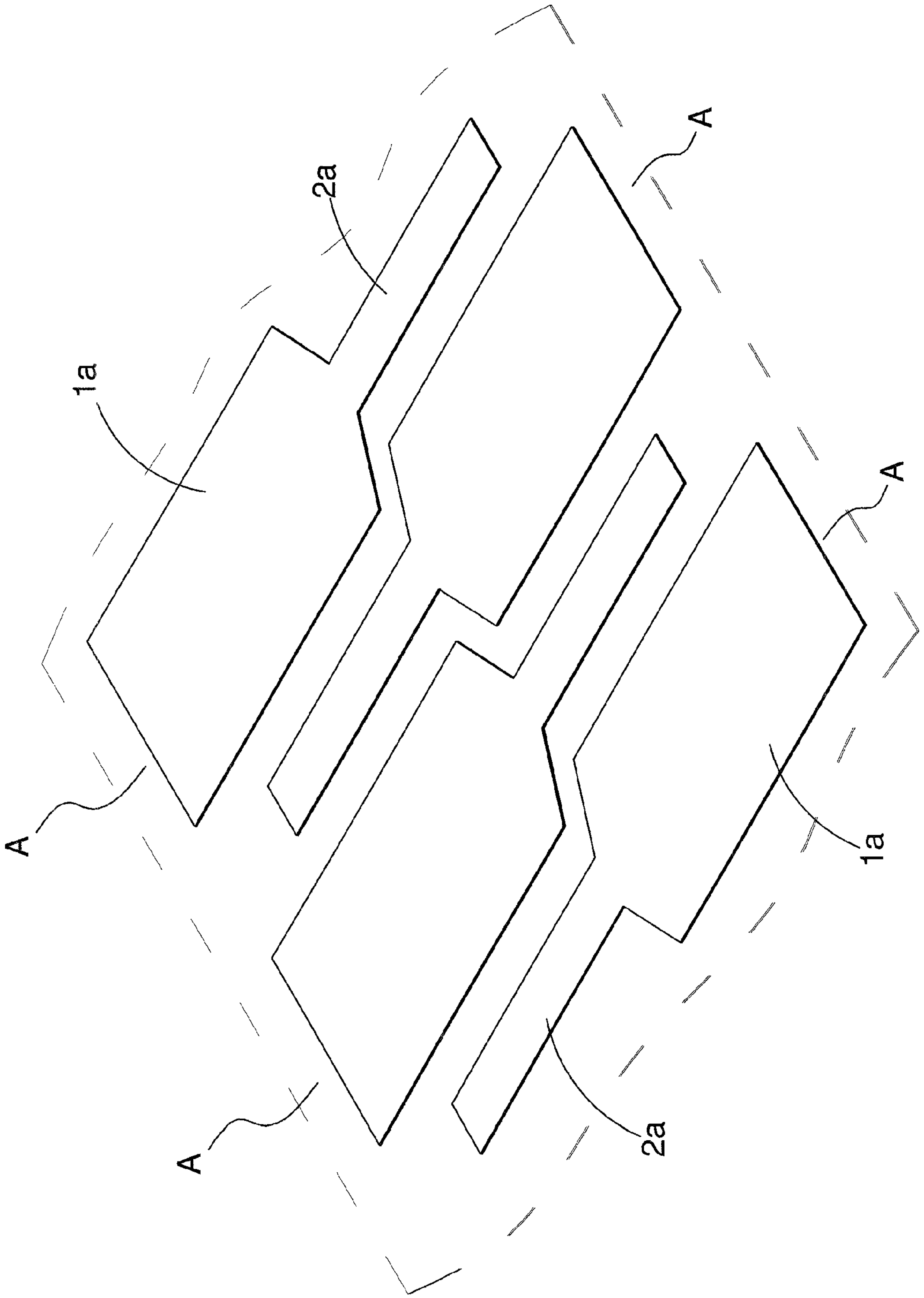
FIG. 9 shows that multiple parts "A" are punched from the metal board in the method of the present invention.
Figure 10:
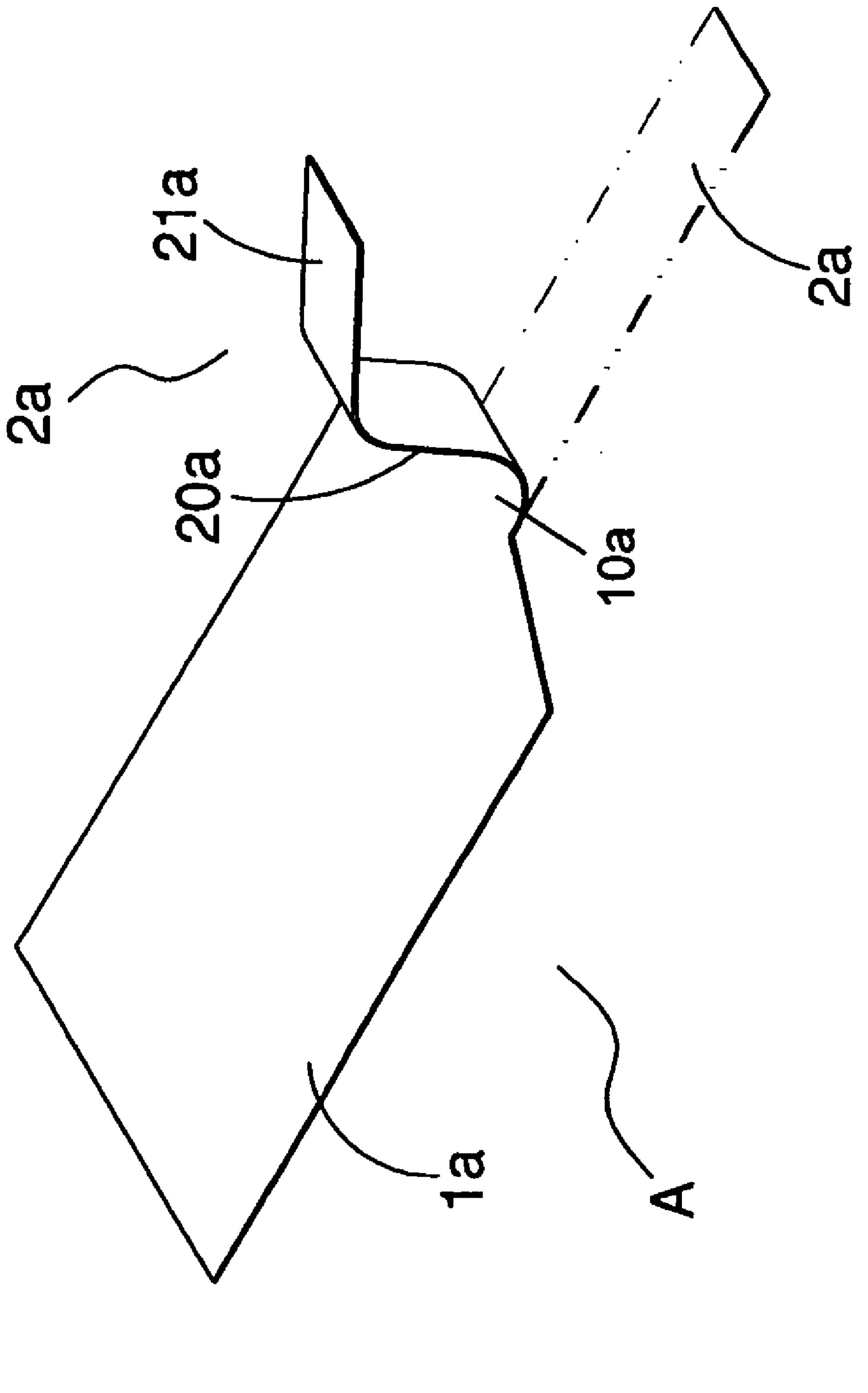
FIG. 10 shows that the extension portion on each part is bent in the method of the present invention.
Figure 11:
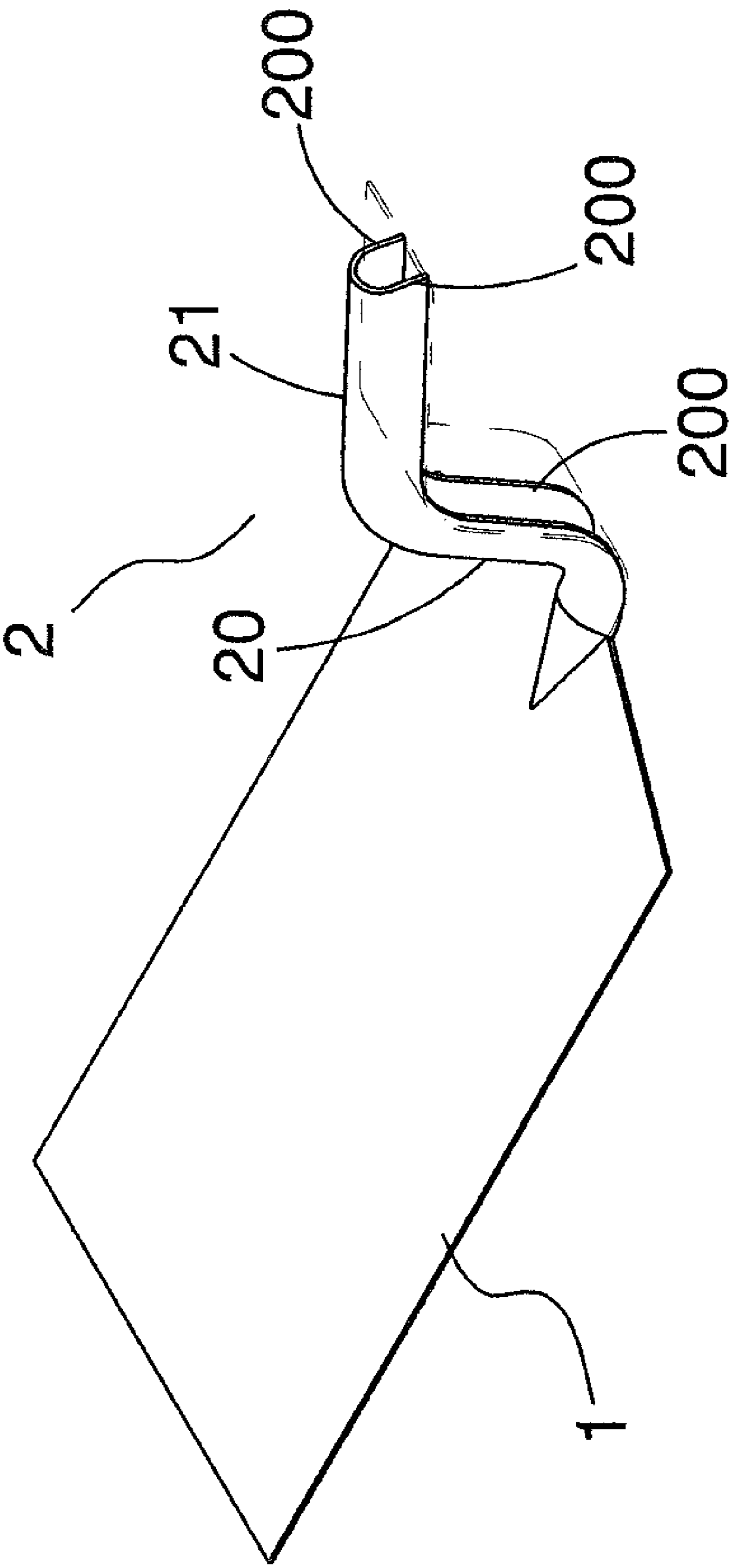
FIG. 11 shows that the extension portion on each part is bent to from the inverted U-shaped wall in the method of the present invention.
Figure 12:
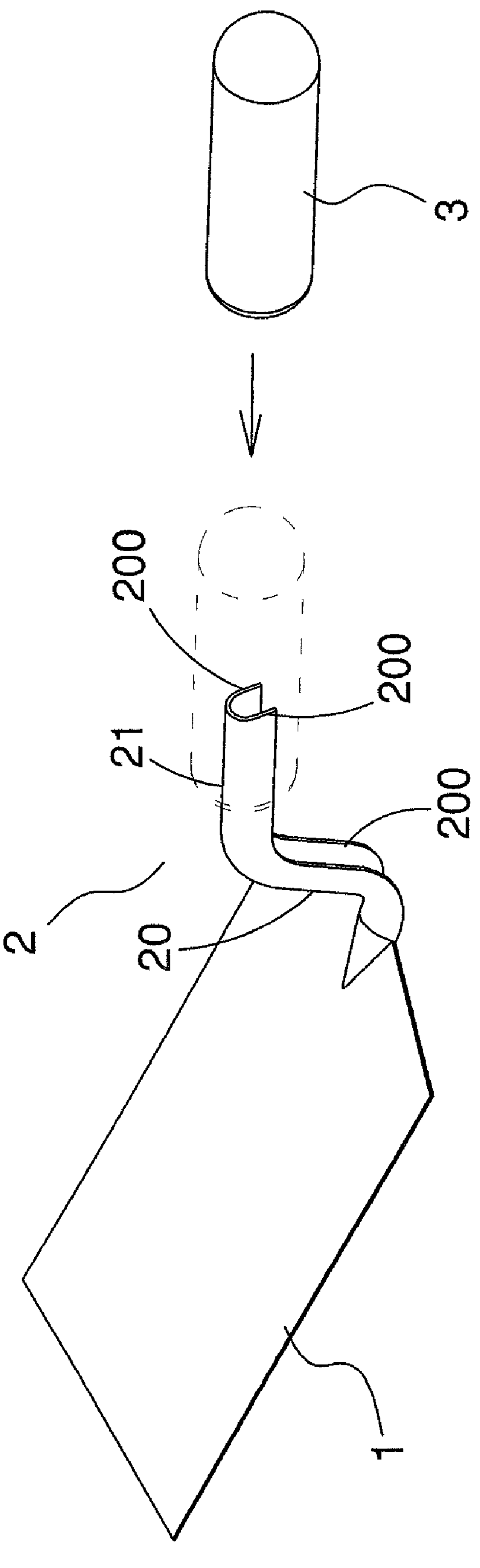
FIG. 12 shows that a grip is connected to the handle in the method of the present invention.

FIG. 7 shows the fourth embodiment of the hand tool of the present invention wherein two extensions 11 extend from the connection end 10 of the plate body 1 and the handle 2 is located between the two extensions 11. A connection portion 12 is connected between two distal ends of the extensions 11.

It is noted that the plate body 1 and the handle 2 are treated by heat treatment to increase their stiffness to meet the requirements of the hand tool when in use. The plate body 1 and the handle 2 can further treated by electro-coating treatment or anodic treatment to avoid from being rusted.

Referring to FIGS. 8 to 12, the method for making the hand tool mentioned above comprises the following steps:

a step of pre-treatment heat treatment to a metal board;

a step of punching multiple parts “A” from the metal board and each part “A” including a plate body l*a* and an extension portion 2*a* integrally extending from the plate body 1*a*;

a step of bending the extension portion 2*a* to include a first section 20*a* and a second section 21*a*, the first section 20*a* extending from the plate body 1*a* by an upward angle and the second section 21*a* extending from the first section 20*a* by an angle and toward one end opposite to a connection end 10*a* from which the first section 20*a* extends;

a step of bending the first and second sections 20*a*, 21*a* to have an inverted U- shaped wall 200 so as to form a handle 2;

a step of applying a post treatment such as electro-plating treatment or anodic treatment to the plate body l*a* and the handle 2, and a step of connecting a grip 3 to the handle 2.

The main advantage of the present invention is that the plate body 1 and the handle 2 can be punched directly from a metal board without further assembly process so that the handle 2 is not separated from the plate body 1. The two sides of the first and second sections 20, 21 of the handle 2 are bent downward to form the U-shaped wall 200. The U-shaped wall 200 of the handle 2 has better structural strength and the weight of the hand tool is reduced.

While we have shown and described the embodiment in accordance with the present invention, it should be clear to those skilled in the art that further embodiments may be made without departing from the scope of the present invention.

What is claimed is:

1. A method for making a hand tool, comprising:

a step of heat treatment to a metal board;

a step of punching multiple parts from the metal board and each part including a plate body and an extension portion integrally extending from the plate body;

a step of bending the extension portion to include a first section, a second section and a third section, the first section extending from the plate body by an upward angle, the second section extending from the first section by an angle, the third section extending from one distal end of the second section and being bent toward the plate body, the third section being located beneath the second section and including curved wall which faces upward, and the third section further includes wave-shaped underside;

a step of bending the first and second sections to have an inverted U-shaped wall so as to form a handle; and a step of applying an electro-coating treatment to the plate body and the handle.

2. The method as claimed in claim 1, wherein the inverted U-shaped wall is a curved wall and faces downward.

3. A method for making a hand tool, comprising:

a step of heat treatment to a metal board;

a step of punching multiple parts from the metal board and each part including a plate body and an extension portion integrally extending from the plate body;

a step of bending the extension portion to include a first section, a second section and a third section, the first section extending from the plate body by an upward angle, the second section extending from the first section by an angle, the third section extending from one distal end of the second section and being bent toward the plate body, the third section being located beneath the second section and including curved wall which faces upward, and the third section further including wave-shaped underside;

a step of bending the first and second sections to have an inverted U-shaped wall so as to form a handle; and a step of applying an anodic treatment to the plate body and the handle.

4. The method as claimed in claim 3, wherein the inverted U-shaped wall is a curved wall and faces downward.

* * * * *